United States Patent
Bulut et al.

(10) Patent No.: US 9,098,420 B2
(45) Date of Patent: Aug. 4, 2015

(54) METHOD AND APPARATUS FOR SYNCHRONIZING A CACHE

(75) Inventors: Serdar Bulut, Hayward, CA (US);
Wei-Meng Chee, Sunnyvale, CA (US);
David Berkowitz, Redwood City, CA (US)

(73) Assignee: NOKIA TECHNOLOGY OY, Espoo (FI)

(*) Notice: Subject to any disclaimer, the term of this patent is extended or adjusted under 35 U.S.C. 154(b) by 251 days.

(21) Appl. No.: 13/279,020

(22) Filed: Oct. 21, 2011

(65) Prior Publication Data
US 2013/0103911 A1    Apr. 25, 2013

(51) Int. Cl.
*G06F 12/00* (2006.01)
*G06F 12/08* (2006.01)

(52) U.S. Cl.
CPC ...... *G06F 12/0866* (2013.01); *G06F 2212/282* (2013.01); *G06F 2212/284* (2013.01)

(58) Field of Classification Search
CPC ............. G06F 12/0866; G06F 2212/282
USPC .................................... 711/118, 144
See application file for complete search history.

(56) References Cited

U.S. PATENT DOCUMENTS

| | | | |
|---|---|---|---|
| 6,105,026 A | 8/2000 | Kruglikov et al. | |
| 2003/0105746 A1 | 6/2003 | Stickler | |
| 2004/0078518 A1* | 4/2004 | Kuwata | 711/113 |
| 2004/0109436 A1 | 6/2004 | Vargas et al. | |
| 2005/0179693 A1 | 8/2005 | Fu et al. | |
| 2006/0236039 A1* | 10/2006 | Golander | 711/147 |
| 2008/0301373 A1* | 12/2008 | Harada et al. | 711/133 |
| 2009/0024916 A1 | 1/2009 | Burckart et al. | |
| 2009/0300084 A1 | 12/2009 | Whitehouse | |
| 2009/0327817 A1 | 12/2009 | Inyengar et al. | |
| 2010/0082529 A1 | 4/2010 | Mace et al. | |
| 2010/0228768 A1* | 9/2010 | Yamasuge et al. | 707/769 |
| 2011/0179078 A1 | 7/2011 | Boerries et al. | |
| 2011/0197032 A1* | 8/2011 | Patey | 711/133 |

FOREIGN PATENT DOCUMENTS

WO    WO 02/28059    4/2002

OTHER PUBLICATIONS

Notification of Transmittal of the International Search Report and The Written Opinion of The International Searching Authority, or The Declaration for International Application No. PCT/FI2012/050940, dated Mar. 13, 2013, pp. 1-17.
Wikipedia "Maximum Transmission Unit," Wikipedia Article, Sep. 7, 2011, retrieved from Internet Mar. 4, 2013 from http://en.wikipedia.org/w/index.phptitle=Maximum_transmission_unit &oldid=448961629.

* cited by examiner

*Primary Examiner* — Aracelis Ruiz
(74) *Attorney, Agent, or Firm* — Ditthavong & Steiner, P.C.

(57) ABSTRACT

An approach is provided for segmenting a cache into one or more cache segments and synchronizing the cache segments. An cache platform causes, at least in part, a segmentation of at least one cache into one or more cache segments. The cache platform further determines that at least one cache segment of the one or more cache segments is invalid. The cache platform also causes, at least in part, a synchronization of the at least one cache segment. The approach allows for a dynamic optimization of the synchronization of the cache segments based on one or more characteristics associated with the devices and/or the connection associated with the cache synchronization.

12 Claims, 11 Drawing Sheets

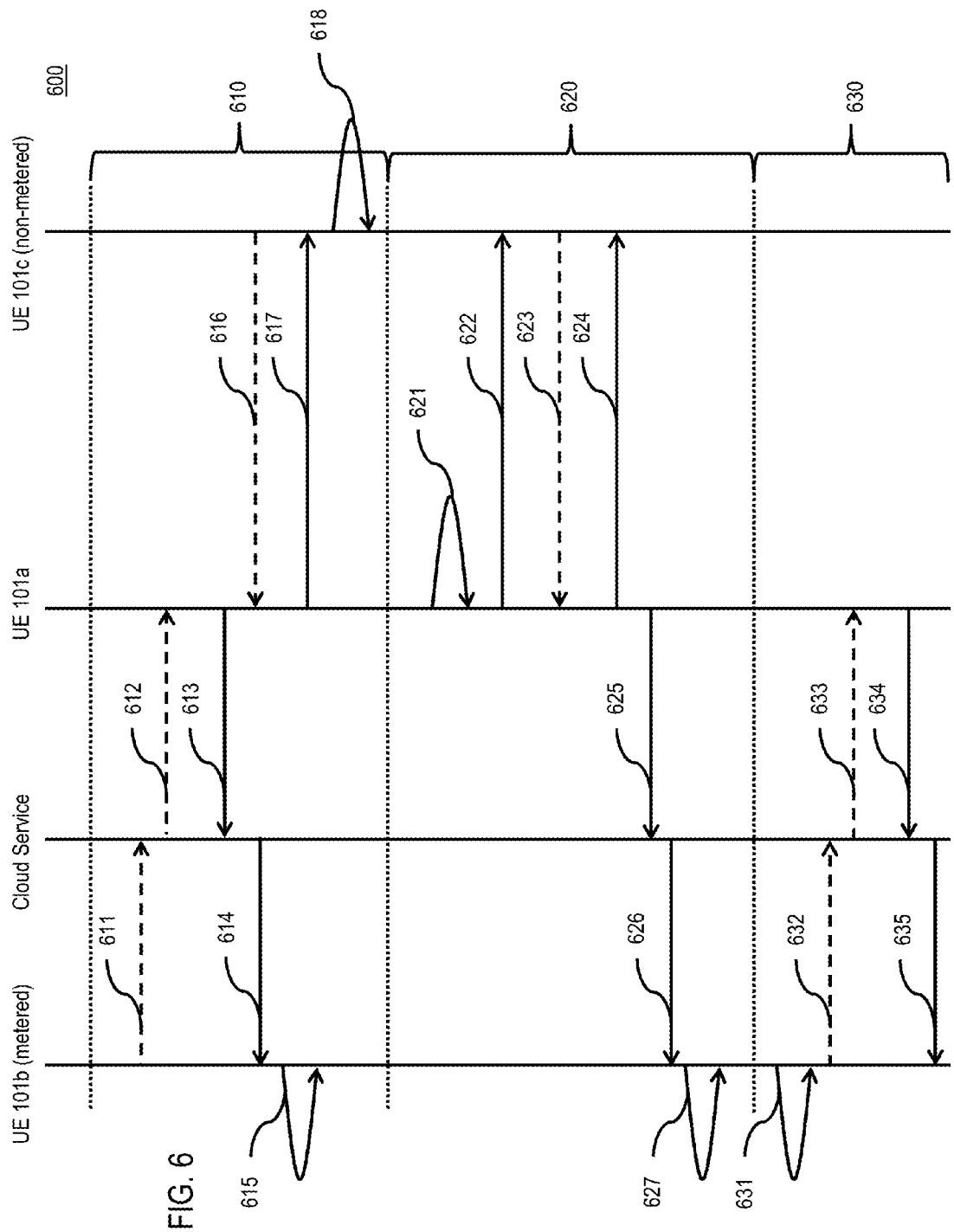

METHOD AND APPARATUS FOR SYNCHRONIZING A CACHE

BACKGROUND

Service providers and device manufacturers (e.g., wireless, cellular, etc.) are continually challenged to deliver value and convenience to consumers by, for example, providing compelling network services. One such network service is providing the ability to view content located on one device through a second device by way of a connection between the two devices. For example, a user may view content located on their desktop computer while on their smart phone located miles away from their desktop. Despite advancements made in, for example, the speed of such connections, transmitting information between devices may cause browsing the content to be prohibitively slow. One way of correcting for such delays is caching information regarding the content such that the second device uses the cache for displaying information regarding the content rather than receiving the information directly from the other device. However, even despite this type of correction, the cache may grow to a large size such that updating the cache to account for changes in the information may be prohibitively slow. Further, merely updating, for example, the specific files within the cache may be prohibitively slow depending on the size of the files. Moreover, synchronizing only part of a modified file may lead to a large number of synchronization that, when combined, creates lag in the devices. Accordingly, device manufacturers and service providers face significant technical challenges in synchronizing caches while reducing the lag time associated with such synchronization.

SOME EXAMPLE EMBODIMENTS

Based on the technical challenges associated with synchronizing caches while reducing the lag time associated with such synchronization, there is a need for an approach for segmenting a cache into one or more cache segments and synchronizing the cache by synchronizing the cache segments.

According to one embodiment, a method comprises causing, at least in part, a segmentation of at least one cache into one or more cache segments. The method also comprises determining that at least one cache segment of the one or more cache segments is invalid. The method further comprises causing, at least in part, a synchronization of the at least one cache segment.

According to another embodiment, an apparatus comprises at least one processor, and at least one memory including computer program code for one or more computer programs, the at least one memory and the computer program code configured to, with the at least one processor, cause, at least in part, the apparatus to segment at least one cache into one or more cache segments. The apparatus is also caused to determine that at least one cache segment of the one or more cache segments is invalid. The apparatus is further caused to synchronize the at least one cache segment.

According to another embodiment, a computer-readable storage medium carries one or more sequences of one or more instructions which, when executed by one or more processors, cause, at least in part, an apparatus to segment at least one cache into one or more cache segments. The apparatus is also caused to determine that at least one cache segment of the one or more cache segments is invalid. The apparatus is further caused to synchronize the at least one cache segment.

According to another embodiment, an apparatus comprises means for causing, at least in part, a segmentation of at least one cache into one or more cache segments. The apparatus also comprises means for determining that at least one cache segment of the one or more cache segments is invalid. The apparatus further comprises means for causing, at least in part, a synchronization of the at least one cache segment.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 6 is a sequence diagram of a communications between three devices associated with updating caches associated with content stored on one of the devices, according to one example embodiment;

DESCRIPTION OF SOME EMBODIMENTS

Examples of a method, apparatus, and computer program for segmenting a cache into one or more cache segments and synchronizing the cache segments are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
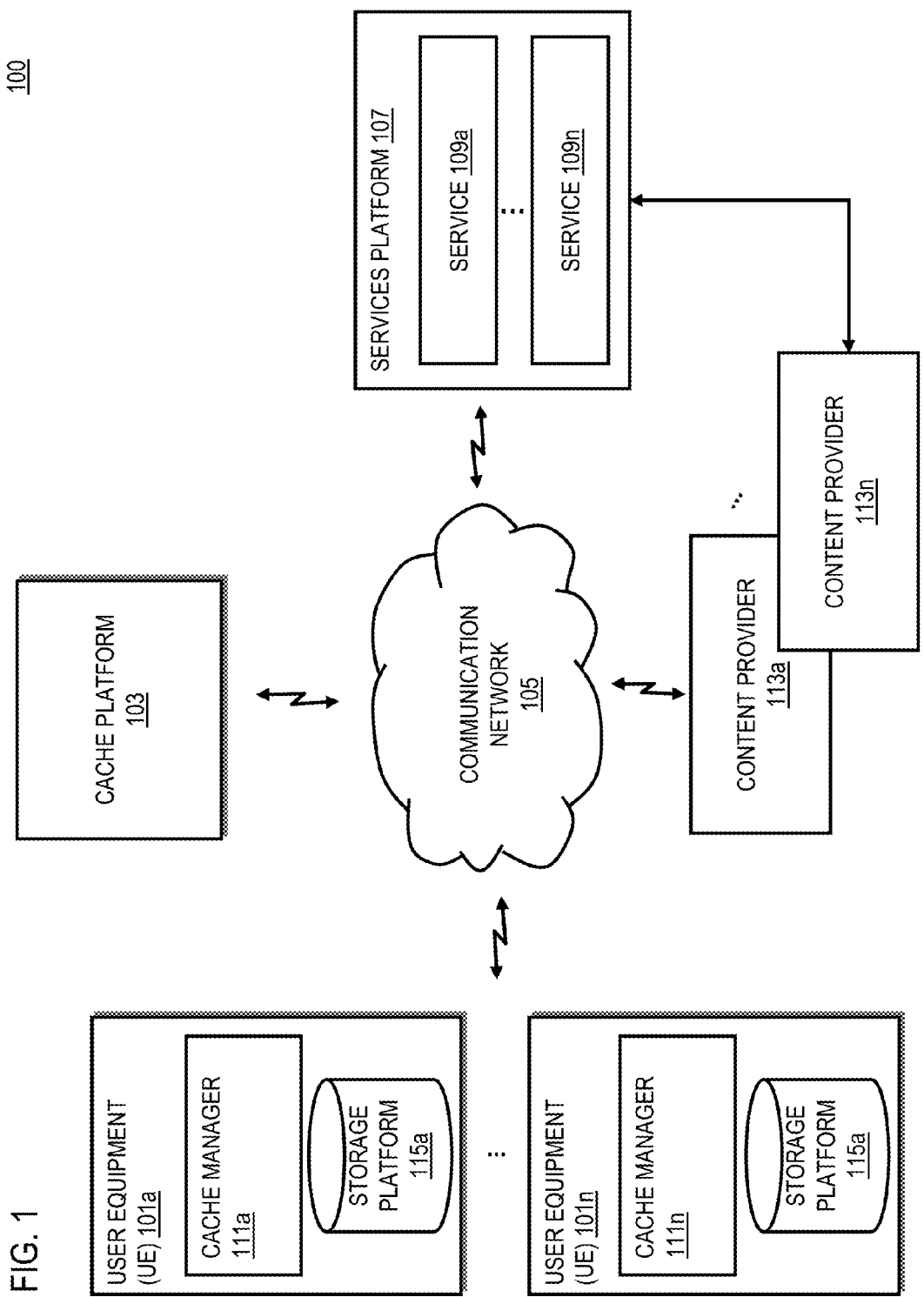
FIG. 1 is a diagram of a system capable of segmenting a cache into one or more cache segments and synchronizing the cache segments, according to one example embodiment.

FIG. 1 is a diagram of a system capable of segmenting a cache into one or more cache segments and synchronizing the cache segments, according to one example embodiment. To alleviate issues that arise from transmitting information between two or more devices, caches of the information may be stored locally at the devices. Thus, rather than having to transmit the information between the devices, the requesting device may simply retrieve the information from the local cache. Such information may represent the content itself, or may be information describing the content, such as metadata. Where the content is, for example, images, videos, audio, documents, maps, media, etc., the metadata may represent, for example, a list of directories, a list of file names, art associated with the audio (e.g., album art for songs), thumbnails associated with the images and videos, status of the content, features of the content, storage location of the content, etc. Thus, rather than transmitting the actual content, or even the metadata associated with the content between the two devices, the requesting device may simply retrieve the content and/or metadata from the local cache.

Changes may occur to the information represented by the cache such that the cache is synchronized with the information. In which case, a communication session is initiated between the two devices. Such synchronization may take a considerable amount of time to synch the entire cache when the cache is large, especially considering connections with lower speeds (e.g., EDGE, 3G, etc.). Further, such synchronization may still take a considerable amount of time when only the file that has been changed is updated within the cache, or when only the metadata associated with the file is updated. In some situations, even a short amount of time can seem long considering the circumstances. For example, when quickly browsing through images located on one device but displayed on another device, even a pause of several seconds between images may be considered long to the user. Thus, even updating only the file that has changed, or the metadata associated with the file that has changed, may be considered by the user as distractingly long.

To address this problem, a system 100 of FIG. 1 introduces the capability to segment a cache into cache segments and synchronize the cache segments. In one embodiment, the system 100 introduces the ability to segment a cache into cache segments. The size of the cache segments may be fixed according to a set size (e.g., 64 kb, 128 kb, 256 kb, etc.), may be based on the connection used in the synchronization, or may be based on several different levels of segment sizes (e.g., first level at 64 kb, second level at 128 kb, third level at 256 kb, etc. based on the statistics of the most and/or least used or accessed content or metadata) or any combination of the aforementioned. The system further may determine that at least one cache segment is invalid based, for example, on a change occurring associated with the information represented by the cache segment. For example, a cache segment is that outdated is considered invalid and will be marked for synchronization. By way of example, device A includes images that are cached on device B. Upon an image being modified on device A, the cache segment within the cache on device B is marked invalid because the cache segment no longer accurately reflects the information on device A (e.g., the modified image). In one example embodiment the cache segment that stores the information that is modified with respect to the image is marked invalid. By way of example, if the name of the file changes, the segment associated with the metadata relating to the filename is marked invalid. Thus, for example, even if the file is 40 MB, information pertaining to the changed portion of the file may represent merely 32 kb or less that is stored in one cache segment. Rather than synchronizing the entire cache, or the entire file that is modified, the cache segment that corresponds to the change is synchronized. Accordingly, the system 100 synchronizes the entire cache segment that is marked invalid. By synching by a cache segment, rather than based on the entire cache, based on an entire file, or even based on only the modified sections of the file, the synching may reduce the time required by reducing the amount of information that is transmitted, and may reduce the number of synchronizations needed by synchronizing a block of information at a time rather than by small portions of information (e.g., only one modified portion at a time).

The one or more cache segments associated with the cache are independent of the file system being cached such that a single file may be associated with one cache segment or many cache segments. Further, many files being cached may be associated with one cache segment or with many cache segments, where parts of the files being cached may be represented in multiple different cache segments. In one embodiment, the cache may only store the metadata associated with the content (e.g., the files). Similarly the metadata associated with a single file may be associated with a single cache segment or with multiple cache segments. The metadata associated with multiple file may be associated with a single cache segment or with multiple cache segments.

In one embodiment, the maintain coherency between the cache and the information stored between the two devices, the cache is used only when a connection can be established between the devices such that the devices can determine whether there is coherency. Further, in one embodiment, the device that maintains the information that is cached on another device represents the master device and is the producer of the information, e.g., sends the notifications of the changes in the information, or sends the updates in the information used for synchronizing. The device that maintains the cache represents the slave device that is read only, e.g., only reads the cache until information is sent to the device that one or more the cache segments is invalid, and/or information on how to modify the cache in response to a change in the information.

As shown in FIG. 1, the system 100 comprises a user equipment (UE) 101a-101n (collectively referred to as UE 101) having connectivity to a cache platform 103 via a communication network 105. The UE 101 may respectively include a cache manager 111a-111n (collectively referred to as cache manager 111). The cache manager 111 may perform the functions of the cache platform 103 (described in detail below). By way of example, in one embodiment where two devices (e.g., two UE 101) are not connected to each other over the same local network, the devices may communicate with each other over the communication network 105 and the cache platform 103 may act as a cloud service or proxy service that provides the functions of caching information between two devices, segmenting the information, and synchronizing the information as discussed below. In one embodiment, where two devices are connected to each other over the same local network, the functions of the cache platform 103 may be provided by the cache managers 111 running on the two devices. The UE 101 may also respectively include a storage platform 115a-115n (collectively referred to storage platform 115). The storage platform 115 may store, for example, one or more caches associated with content on one or more devices and/or systems (e.g., UE 101, services platform 107, content provider 113, etc.).

The system 100 further includes a services platform 107 that includes one or more services 109a-109n (collectively referred to as services 109). The services platform 107 may provide one or more of the services 109 to the UE 101 and to the cache platform 103. The services 109 may include, for example, a content provisioning service, a content caching service, a social networking service, a video conferencing service, a multimedia processing service, and the like. The system 100 further comprises one or more content providers 113a-113n (collectively referred to as content providers 113). The content providers 113 may provide content to the UE 101, the cache platform 103, and/or the services 109 on the services platform 107. The content may include, for example, audio content, video content, image content, documents, and the like. In one embodiment, the cache platform 103 and the services platform 107 may be combined such that one or more of the services 109 on the services platform 107 perform the functions of the cache platform 103. In one embodiment, the cache platform 103, the services platform 107 and the content providers 113 may act as a cloud based service where content is stored in the content providers and one or more of the UE 101 cache information pertaining to the content within the storage platform 115. Thus, in this embodiment, the cache platform 103, the services platform 107, and the content providers 113 may act as a UE 101 that stores information that one or more other UE 101 cache according to the below discussion.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, near field communication (NFC), Internet Protocol (IP) data casting, digital radio/television broadcasting, satellite, mobile ad-hoc network (MANET), and the like, or any combination thereof.

The UE 101 is any type of mobile terminal, fixed terminal, or portable terminal including a mobile handset, station, unit, device, mobile communication device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

As discussed above, in one embodiment, the cache platform 103 interacts with the UE 101 as a cloud based service or a proxy service to allow communications between two or more UE 101. In one embodiment, where two or more UE 101 are in direct communication, such as when, for example, the two or more UE 101 are connected via the same router, hub, or switch and/or are behind the same firewall, the cache managers 111 on the UE 101 may perform the functions of the cache platform 103.

In one embodiment, a synchronization of one or more cache segments associated with a cache may be based on a connection type associated with the synchronization. The connection type may be non-metered or metered, unlimited data or limited data, fast or slow, etc. Non-metered versus metered connections may be based on, for example, whether a user must pay for data transmitted over the connection. Non-metered connections may include, for example, connections between devices where the devices are on the same local network, such as connected to the same router, hub, and/or switch, connections behind the same firewall, a wired connection, a wireless WiFi connection, a connection over the Internet, and the like. Metered connections may include, for example, connections between devices over a cellular network (e.g., GSM, CDMA, EDGE, 3G, 4G, WiMax, etc.). Such metered connections may be slower than non-metered connections and require that the user pay for the data transmitted over the connection. An unlimited data downloading plan/agreement with a data service provider may also be considered as the non-metered connection.

In one embodiment, where the connection type is non-metered, the synchronization may be based on receipt of a notification indicating that a cache segment is invalid. Upon receipt of the notification, the synchronization between the invalid cache segment and the modified content represented by the cache segment may occur such that there is substantially no delay between receipt of the notification and updating the cache segment. By way of example, where the UE 101a and the UE 101b are connected via the same router, upon receipt by the UE 101b that a cache segment is invalid based on a change in the content at the UE 101a, the UE 101b may immediately request and then receive the updated content used to modify the cache segment from the UE 101a with substantially no delay. The immediate request for the updated content may occur, for example, because the connection between the UE 101a and the UE 101b is unmetered and fast such that any delay caused by the request is insignificant with respect to viewing information stored in the cache, or because the user associated with the UE 101b does not need to pay for the synchronization on, for example, a per kilobyte basis, or the invalid cache segment is marked as a frequently used segment by the UE 101, or any combination of the aforementioned. In one embodiment, despite the connection type being non-metered, an invalid cache segment may not be synchronized if, for example, the cache segment is determined as being one of the least accessed cache segments (e.g., a number of accesses to the cache segment is below a set threshold). For example, the cache segment may seldom if ever be accessed. Accordingly, despite the non-metered connection type, the invalid cache segment is not synchronized (e.g., there may be no reason/benefit for updating the invalid cache segment).

In one embodiment, where the connection type is metered, the synchronization may be based on a request for a cache segment that has been marked invalid. Upon receipt of a notification of an invalid cache segment, no response may be taken because, for example, the user of the UE 101 associated with the cache may seldom or never request information associated with the invalid cache segment. Thus, there may be no need to synchronize the invalid cache segment. However, a request for information associated with the invalid cache segment may trigger the synchronization of the invalid cache segment. By way of example, where an image associated with the UE 101a is modified, and a notification is received at the UE 101b regarding the modification, no action may be taken because the user of the UE 101b may never request information regarding the modified image. However, upon a request for information regarding the modified image, such as the modified metadata associated with the modified image, synchronization may occur to update the invalid cache segment so that the user of the UE 101b receives accurate information regarding the image. In one embodiment, a threshold number of invalid cache segments may be determined such that, above the threshold number of invalid cache segments, cache segments that are marked as invalid are synchronized regardless of the connection type, whether a request is received for the invalid cache segment, or a combination thereof. In one embodiment, despite not receiving a request for an invalid cache segment where a connection type is metered, the invalid cache segment may be synchronized if, for example, the cache segment is determined as being one of the most accessed cache segments (e.g., a number of accesses to the cache segment is above a set threshold).

In one embodiment, the cache platform 103 causes a segmentation of a cache into one or more levels of cache segment sizes, with each level of segment size having a varying size. For example, a cache may be segmented to have segment sizes of 64 kb. The same cache may be segmented to also have segment sizes of 128 kb (e.g., two 64 kb segments combined into one and considered a single cache segment). The same cache further may be segmented to have segment sizes of 256 kb (e.g., two 128 kb segments combined into one, or four 64 kb segments combined into one). Based on the connection type used in the synchronization of invalid cache segment, a size of the cache segment may be selected such that, for example, with respect to metered connections, the segment size is smaller and, with respect to non-metered connections, the segment size is larger. Thus, for example, for connection speeds above a set threshold, transmitting a larger amount of information may take the same amount of time as transmitting a smaller amount of information over a slower connection speed. Accordingly, a larger segment size may be used to update the cache at faster speeds than at slower speeds. In one embodiment, the segmentation of the cache into one or more levels of cache segment sizes may be based on, for example, a most accessed cache segment, a least accessed cache segment, or a combination thereof. By way of example, one level of cache segment size may correspond to a cache segment size of a cache segment that was previously accessed the most based on a set threshold, and one level of cache segment size may correspond to a cache segment size of a cache segment that was previously accessed the least based on a set threshold.

In one embodiment, the number of invalid cache segments may also affect the segment size of a cache segment that is synchronized. For example, for connection types that are faster than a set threshold, such as a metered connection as compared to other metered connections (e.g., 4G as compared to EDGE), despite receiving a request associated with only one invalid cache segment, more than one invalid cache segment also may be updated. For example, two invalid cache segments at a first level of segmentation (e.g., 64 kb) may correspond to the same cache segment at a second level of segmentation (e.g., 256 kb). Thus, although the request only concerns one of the two cache segments at the first level of segmentation, because the two invalid cache segments correspond to the same cache segment at a higher level of segmentation, and because the connection type associated with the synchronization is fast (e.g., over a set speed threshold), the entire cache segment at the second level of segmentation may be synchronized such that both of the two invalid cache segments are synchronized rather than only the one invalid cache segment.

In one embodiment, the cache segments include content segments and index segments. The content segments may include information regarding the content on the other device, such as the metadata associated with the files (e.g., images, recordings, videos, documents, etc.) located on the other device. The index segments may include an index of the information contained in the content segments. The index segments may include additional information beyond merely segment allocation tables, such as offset location, range, validity (out-of-sync information), etc. The cache may be segmented into M content segments and N index segments. In one embodiment, the cache may be segmented into M content segments and N index segments prior to caching information associated with another device. Thus, as the information is received regarding the content of the other device, the information is cached into the content segments and indexed in the index segments. In one embodiment, one content segment is filled before filling another content segment. In one embodiment, information stored in the content segments is equally distributed between the content segments.

In one embodiment, both the master device (e.g., the device that includes the content indexed by other devices) and the slave devices (e.g., the devices that include the caches that store the information associated with the content) include the cache, segmented and index identically. Accordingly, when information associated with the content at the master device changes, the master device can determine the cache segment, including the content segment and the index segment, that is changed. Accordingly, the master device may notify the slave devices of the change by providing an identification associated with the cache segment, and the associated content segment and index segment. In another embodiment, the slave device can decide the cache segmentation in the device based on its one or more preferences, such as the type of the communication network, and/or information/statistics on the most and least used content.

By way of example, the UE 101, the cache platform 103, the services platform 107, the services 109, and the content providers 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
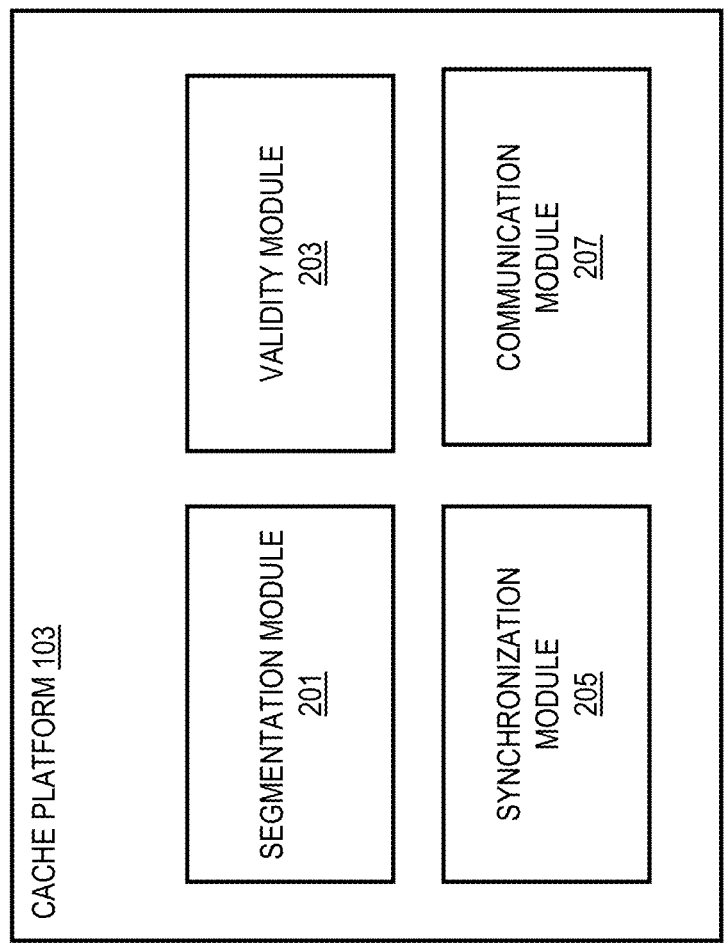
FIG. 2 is a diagram of the components of a cache platform, according to one example embodiment.

FIG. 2 is a diagram of the components of the cache platform 103, according to one example embodiment. By way of example, the cache platform 103 includes one or more components for providing segmentation of a cache into one or more cache segments and synchronizing the cache segments. It is contemplated that the functions of these components may be combined in one or more components or performed by other components of equivalent functionality. By way of example, in one embodiment, the functions of the cache platform 103 may be embodied in a cache manager 111 located at the UE 101. In one embodiment, the functions of the of the cache platform 103 may be embodied in a cloud based service that encompasses, for example, the cache platform 103, the services platform 107, and the content providers 113. In an exemplary embodiment, the cache platform 103 includes a segmentation module 201, a validity module 203, a synchronization module 205, and a communication module 207.

The segmentation module 201 determines the segmentation of the cache. In one embodiment, the segmentation module 201 segments the portion of the storage platform 115 used as the cache into cache segments. The cache segments may include content segments and index segments. The index segments include an index of the information included in the content segments, such as segment allocation tables. The segmentation module 201 may segment the cache into M content segments and N index segments, where M and N may be any integer. In one embodiment, prior to caching information in the cache, the segmentation module 201 segments the cache into a fixed number of cache segments. In which case, the cached information may be distributed into the cache segments as the cache segments become full, or equally distributed between the cache segments. In one embodiment, the segmentation module 201 creates segments within the cache as information is cached within the cache. In which case, when a cache segment reaches a determined maximum size, another cache segment is created. As cache segments are created, index segments are modified accordingly to accommodate for the additional cache segments.

In one embodiment, the segmentation module 201 may create cache segments based on a fixed size (e.g., 64 kb, 128 kb, 256 kb, etc.) and all of the cache segments may be of the same size. In one embodiment, the segmentation module 201 may segment the cache into cache segments of one or more levels of cache segment size. For example, if the entire cache is 1024 kb in size, the segmentation module 201 may segment the cache into one level of two 512 kb cache segments (e.g., segments 1 and 2), one level of four 256 kb cache segments (e.g., segments 1.1, 1.2, 2.1 and 2.2), one level of eight 128 cache segments (e.g., segments 1.1.1, 1.1.2, 1.2.1, 1.2.2, 2.1.1, 2.1.2, 2.2.1 and 2.2.2), one level of sixteen 64 kb cache segments (e.g., 1.1.1.1, 1.1.1.2, 1.1.2.1, 1.1.2.2, etc.), etc. Accordingly, the data represented in the cache may correspond to several different cache segments of several different sizes. For example, each byte of data is represented by four cache segments in the above example (e.g., 1, 1.1, 1.1.1, and 1.1.1.1). In one embodiment, the segmentation module 201 will segment the cache according to a segment size based, for example, on a connection type between two or more devices associated with the synchronization and/or the most and least used/accessed content.

The validity module 203 determines the validity of the one or more cache segments, and correspondingly the one or more content segments and index segments, associated with the cache. In one embodiment, the validity module 203 stores information pertaining to which of the cache segments are valid. The validity module 203 monitors for notifications that one or more cache segments are invalid based on, for example, information represented by the cache segments changing at another device. The validity module 203 interfaces with the communication module to determine incoming notifications.

The synchronization module 205 synchronizes one or more cache segments that are invalid. The synchronization module 205 determines to synchronize the invalid cache segments based on, for example, a connection type associated with the synchronization, the number of invalid cache segments, the most and least used cache segments, a request for one or more invalid cache segments, or any combination thereof. In one embodiment, the validity module 203 interfaces with the synchronization module 205 to indicate that one or more cache segments are invalid. In response, the synchronization module 205 determines the connection type associated with the synchronization. In one embodiment, for non-metered connection types, the synchronization module 205 substantially immediately determines to synchronize the one or more invalid cache segments upon a notification that the cache segments are invalid. In one embodiment, for non-metered connection types, the synchronization module 205 may wait for a threshold number of invalid cache segments prior to synchronizing the invalid cache segments. For example, the synchronization module 205 may wait for five invalid cache segments prior to synchronizing the cache segments.

In one embodiment, for metered connection types, the synchronization module 205 may not synchronize one or more invalid cache segments upon receiving the indications that the cache segments are invalid. Rather, the synchronization module 205 may synchronize the invalid cache segments only upon receiving a request for an invalid cache segment, such as a request to view the information contained within the invalid cache segment. At which point, the synchronization module 205 may synchronize the requested, invalid cache segment to present to correct information.

In one embodiment, where the segmentation module 201 segmented the cache into more than one level of segment sizes, the synchronization module 205 may determine to synchronize the invalid cache segments based on a speed of the connection type used in the synchronization, the most and least used/accessed segments, the number of invalid cache segments, a request for one or more invalid cache segments, a level of segment size, or any combination thereof, regardless of whether the connection is metered or non-metered. For example, the synchronization module 205 may set one or more thresholds associated with a connection speed that are also associated with a level of segment size (e.g., fastest connection speed associated with largest segment size, slowest connection speed associated with smallest segment size, so forth for speeds there between). Upon a request for a cache segment that is invalid, the synchronization module 205 may determine to synchronize a cache segment associated with the invalid cache segment that is larger in segment size than the invalid cache segment (e.g., a cache segment that is larger than the invalid cache segment such that the invalid cache segment is incorporated within the larger cache segment). Thus, despite receiving a request for only one invalid cache segment, multiple invalid cache segments may be updated within one synchronization as discussed in detail below with respect to FIG. 5.

The communication module 207 receives and transmits one or more communications associated with synchronizing one or more invalid cache segments. The communication module 207 receives information associated with content on one or more other devices and transmits the information to the segmentation module 201 for caching the information into one or more cache segments. The communication module 207 also receives and/or sends one or more notifications associated with invalid cache segments and/or modified content information and interfaces with the validity module 203 for determining the validity of cache segments. The communication module 207 also transmits information pertaining to synchronizations.

In one embodiment, with respect to a notification of an invalid cache segment, the notification may identify the invalid cache segment based on, for example, the cache segment indication because both the slave and the master devices contain information regarding the cache segments. In one embodiment, the notification may identify the invalid cache segment based on the file and/or metadata that was changed that is used to correlate to the cache segment associated with the file. In one embodiment, the notification may identify the invalid cache segment based on the file and/or metadata that was changed, along with the specific portion of the file or metadata.

In one embodiment, with respect to notification of invalid cache segments where the segmentation module 201 segmented the cache into different levels of cache segment size, an indication of invalidity of a specific cache segment may be translated into an indication of invalidity with respect to associated cache segments of a larger level of cache segment size, a smaller level of cache segment size, or a combination thereof. Accordingly, with respect to the example of cache segment sizes discussed above, an indication that cache segment 1.1.2 is invalid may be translated into an indication that cache segments 1 and 1.1 are invalid. Further, an indication that cache segment 1.1.2 is invalid may also be translated into an indication that cache segment 1.1.2.2 is invalid, where cache segment 1.1.2.2 includes the information that changed to cause cache segment 1.1.2 to be marked as invalid. Thus, no matter what level of invalidity of the cache segment with respect to level of cache segment size, a cache segment may be synchronized to correct the change information that correlates to, for example, the connection type associated with synchronization.

By way of example, during a connection type of 4G, a notification may be received indicating that cache segment 1.1.2 is invalid. Because the connection type is metered, and if a request for cache segment 1.1.2 is not received, the cache segment 1.1.2 may remain invalid. Because cache segment 1.1.2 is marked as invalid and cache segment 1.1.2.2 includes the information that caused 1.1.2 to be marked invalid, cache segment 1.1.2.2 is also marked invalid. At a later time, during a connection type of 3G (e.g., a connection slower than 4G), a request for the entire cache segment 1.1.2 may be received. Because cache segment 1.1.2.2 is the actual cause for cache segment 1.1.2 to be marked invalid, cache segment 1.1.2.2 may be synchronized rather than 1.1.2 to further reduce the amount of information that is transmitted while still transmitting an entire cache segment considering that the connection is a slower connection (e.g., 3G as compared to 4G) as when the notification may have been received. The same analysis may be performed for faster connections as compared to the connection type at which the notification was received (e.g., WiFi as compared to 4G, and synchronizing cache segment 1 or 1.1 rather than only 1.1.2).

In one embodiment, with respect to the synchronization, because the master and slave devices include information pertaining to the cache segments, the slave device can request to update an entire cache segment in response to a notification based on providing an identification of the cache segment, which the master uses to provide the updated cache segment to the slave device.

Figure 3:
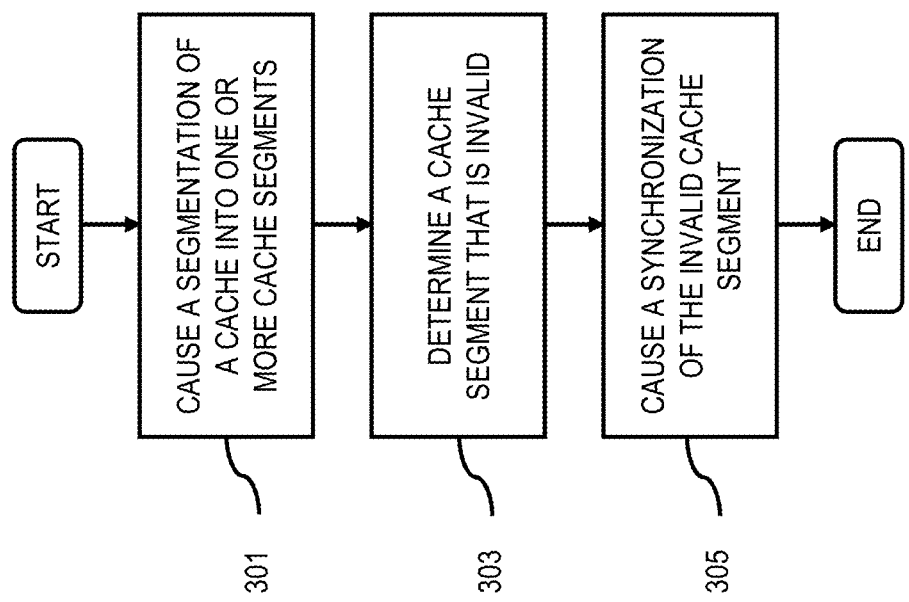
FIG. 3 is a flowchart of a process for segmenting a cache into one or more cache segments and synchronizing the cache segments, according to one example embodiment.
Figure 9:
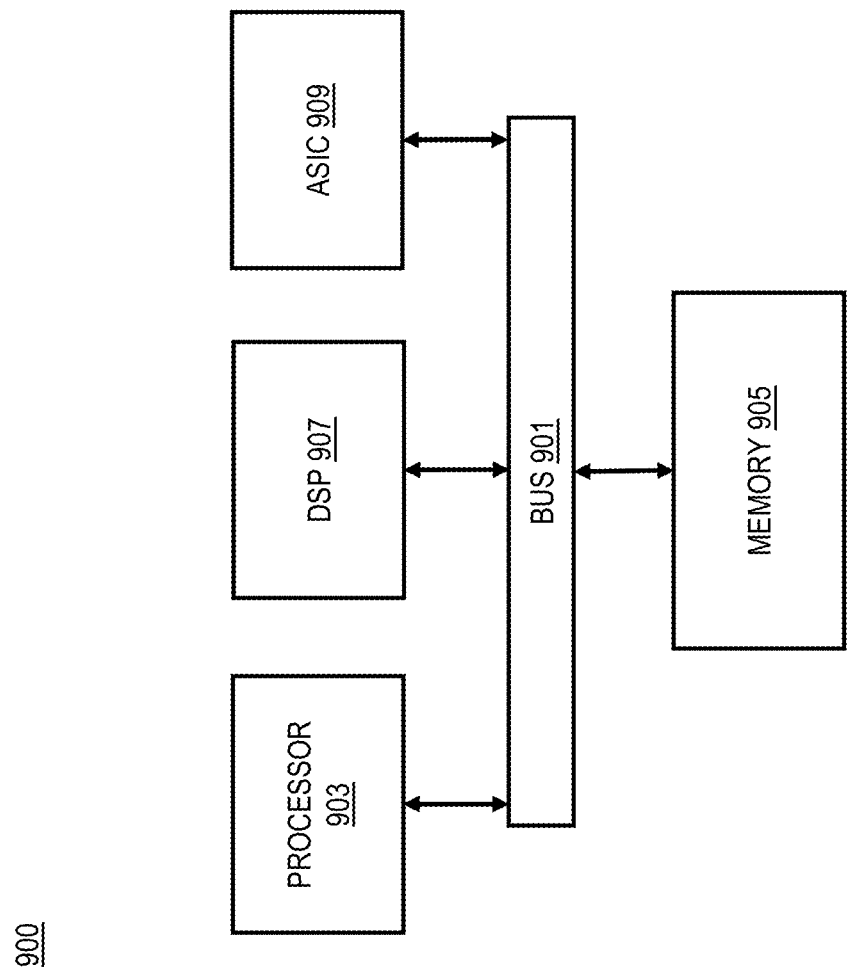
FIG. 9 is a diagram of a chip set that can be used to implement an embodiment of the invention.

FIG. 3 is a flowchart of a process 300 for segmenting a cache into one or more cache segments and synchronizing the cache segments, according to one embodiment. In one embodiment, the cache platform 103 performs the process 300 and is implemented in, for instance, a chip set including a processor and a memory as shown in FIG. 9. In step 301, the cache platform 103 causes a segmentation of a cache on a device (e.g., UE 101) into one or more cache segments. The one or more cache segments may include M cache segments, where M is any set number. In one embodiment, the cache segments include content segment and index segments, where the number of content segments is M, and the number of index segments is N. In one embodiment, a cache is full upon segmenting the cache. In one embodiment, the cache is empty upon segmenting the cache. In one embodiment, the cache is segmented as information is stored within the cache, as the individual cache segments reach the maximum cache size and other additional cache segments are generated. As discussed above, the segmentation may be based on, for example, a fixed size set by the service provider of the cache platform 103, the user of the device, or a combination thereof; the connection type associated with the synchronization, a most accessed cache segment, a least accessed cache segment, or a combination thereof. In one embodiment, the segmentation may be based on several different levels of cache segment sizes, as discussed in detail with respect to FIG. 5 below.

In step 303, the cache platform 103 determines that a cache segment is invalid. The cache platform 103 may determine a cache segment is invalid based on receiving a notification or by actively searching for invalid cache segments. A cache segment may be invalid based on a change associated with the content represented by the cache segment. In one embodiment, the cache platform 103 determines that a cache segment is invalid upon receipt of one or more notifications of an invalid cache segment. In one embodiment, a notification of an invalid cache segment may include, for example, an indication of the cache segment that is invalid based on an identification associated with the cache segment. In one embodiment, a notification of an invalid cache segment may include, for example, an indication of a content segment and an index segment associated with a cache segment that is invalid. In one embodiment, a notification of an invalid cache segment may include, for example, an indication of the content and/or metadata (e.g., an indication of a specific file) that has been modified and may also indicate a location within the file of the modification. In response to the indication of the file that has been modified, the cache platform 103 may determine what cache segment and/or what content segment and index segment the file and/or the portion of the file corresponds to the modification.

In step 305, the cache platform 103 causes a synchronization of the invalid cache segment. The synchronization of the cache segment updates the entire cache segment that was marked invalid based on the change in the content. In one embodiment where the cache segment includes a content segment and an index segment, the synchronization includes synchronizing the entire content segment and the entire index segment. Accordingly, by synchronizing the entire cache segment, rather than the entire cache, or by an entire file, the cache platform 103 may reduce the time required for synchronization. Further, by the slave acting as read only until receiving a notification of a change by the master, there is a one-way route of replication. In one embodiment, the synchronization may be based on, for example, a connection type associated with the synchronization, a threshold number of invalid cache segments, a most accessed cache segment, a least accessed cache segment, a request for an invalid cache segment, an invalid cache segment associated with a requested invalid cache segment, or any combination thereof, as discussed in detail with respect to FIG. 4 below.

Figure 4:
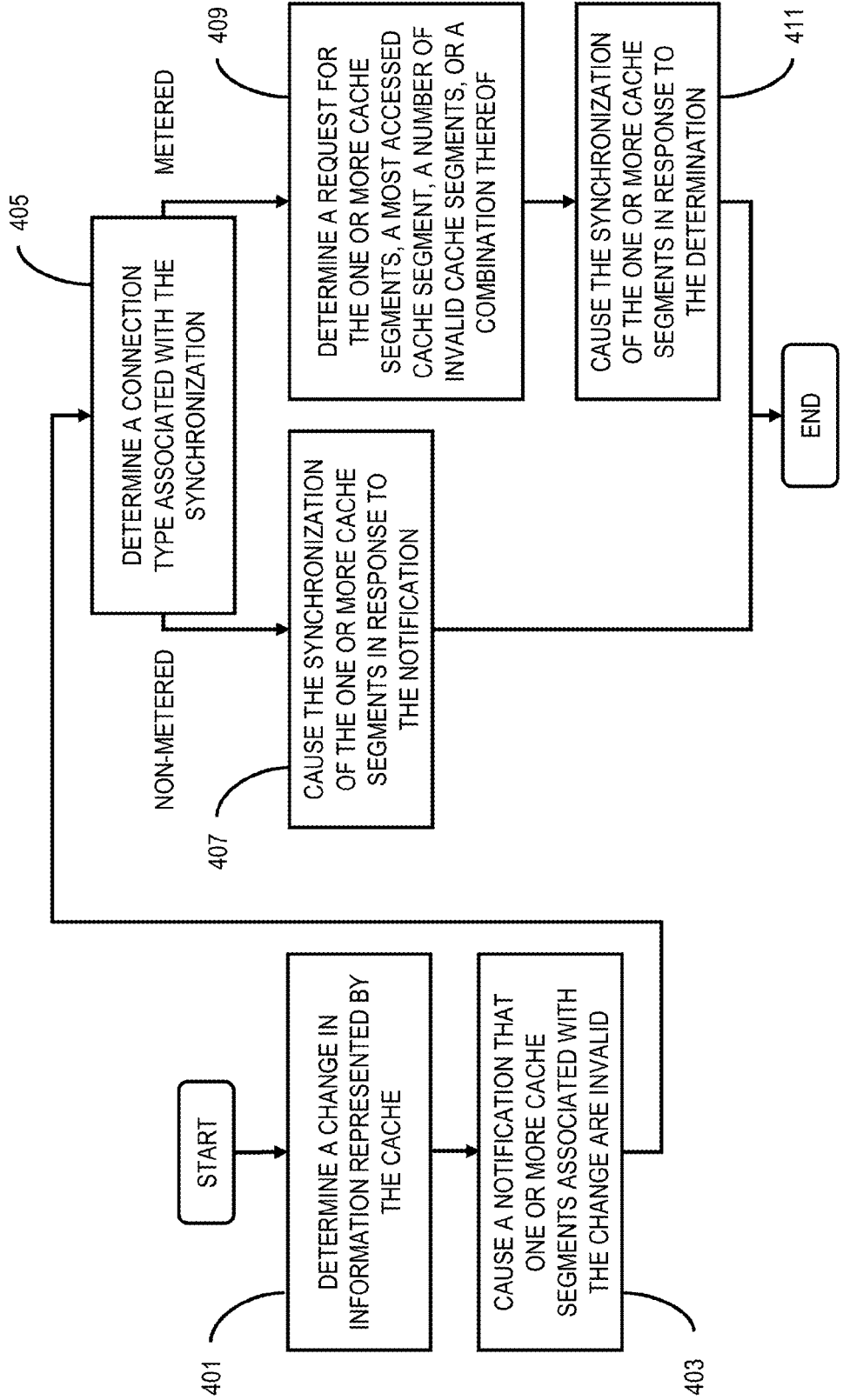
FIG. 4 is a flowchart of a process for segmenting a cache into cache segments and synchronizing the cache segments based on a connection type associated with the synchronization, according to one example embodiment.

FIG. 4 is a flowchart of a process 400 for a process for segmenting a cache into one or more levels of cache segment sizes and synchronizing cache segments based on a connection type associated with the synchronization, according to one embodiment. In one embodiment, the cache platform 103 performs the process 400 and is implemented in, for instance, a chip set including a processor and a memory as shown in FIG. 9. In step 401, the cache platform 103 determines a change in information represented by at least one cache. The information may be associated with one device, and the at least one cache may be associated with at least one other device. By way of example, the information may include a file that has been modified, metadata associated with a file that has been modified, or a combination thereof. Thus, the cache platform 103 determines a change in the file and/or the metadata and determines that the change is associated with a cache associated with at least one other device.

At step 403, the cache platform 103 causes an notification that one or more cache segments associated with the change are invalid. In one embodiment, the notification may include an identification of the specific cache segment that is invalid because both the master device and the slave device share the cache information, such as the cache index information. In one embodiment, the notification may include the specific content segment and index segment associated with the cache segment that is invalid. In one embodiment, the notification may include an indication of a file that was modified and a location within the file that was modified. In which case, the cache platform 103 may determine the cache segment that includes the specific information associated with the file and the location within the file that was modified.

At step 405, the cache platform 103 determines a connection type associated with the synchronization. Although a synchronization of a cache segment may not yet have occurred, a connection type associated with the synchronization may have already been established by having the device associated with the content and the device associated with the cache already having established a connection for communication. If a connection for communication is not already established, the cache platform 103 may determine the possible connections for communication between the devices and select one of the connections based on, for example, the fastest, non-metered, or a combination thereof connection.

If the connection type is non-metered, the process 400 proceeds to step 407. If the connection type is metered, the process 400 proceeds to step 407. However, although illustrated in FIG. 4 and described as being either metered or non-metered, the distinguishing feature of the connection type may be, for example, any type of distinction, such as above a speed threshold versus below a speed threshold, unlimited data versus limited data, etc. with the more limiting distinction taking the path of step 409.

At step 407, the cache platform 103 causes a synchronization of the one or more invalid cache segments substantially immediately in response to the notification. The synchronization includes the entire cache segment, and the entire content segment and index segment, that are affected by the change/notification. After the synchronization, the master device and the slave device are again synchronized with respect to the content and the cache. The cache platform 103 then continues performing synchronization as changes occur.

In one embodiment, where the one or more cache segments that are marked invalid are cache segments that are the least accessed cache segments, the cache platform 103 may determine to not synchronize the one or more invalid cache segments. In which case, the cache platform 103 may instead wait for a request for the one or more invalid cache segments before synchronizing the cache segments.

For a metered connection, at step 409, the cache platform 103 determines whether there is a request for the one or more invalid cache segments. A request for the one or more invalid cache segments may include, for example, a request to present information stored in the invalid cache segments at a device to represent what is stored on another device. By way of example, a user may be browsing through thumbnails of images stored on another device. Upon reaching a thumbnail associated with an image that has been changed, but the change has not yet been reflected within the cache, the request to view the thumbnail will act as a request for one or more invalid cache segments. If a request for one or more invalid cache segments is received, the process 400 proceeds to step 411.

If at step 409 a request is not received, or prior to determining if a request is received, in one embodiment, the cache platform 103 further determines if the one or more invalid cache segments are the most accessed cache segments. If the one or more invalid cache segments are the most accessed cache segments, the process 400 may proceed to step 411 regardless of whether a request for the one or more invalid cache segments is received. By way of example, a cache segment may be marked invalid that is the most accessed cache segment. It may be beneficial to synchronize the cache segment regardless of whether there is a request for the cache segment because, for example, there may be a request for the cache segment in the near future. Accordingly, the cache segment will already be synchronized at the time of the request in the near future.

Further, in one embodiment, if a threshold number of cache segments have been marked invalid, the process 400 may proceed to step 411 regardless of whether a request for the one or more invalid cache segments is received to prevent, for example, too many invalid cache segments from building up and potentially requiring a mass synchronization in the future when a large number or all of the invalid cache segments are requested at the same time.

In one embodiment, if the device associated with the cache includes one or more cache segments marked as invalid changes a connection type associated with the synchronization, the cache platform will automatically determine if the new connection type allows for an automatic synchronization of the cache segments marked as invalid. Thus, by way of example, if the device associated with the cache subsequently connects to the device associated with the content over a non-metered connection, and cache segments exists that are marked as invalid, the cache platform 103 will automatically synchronize the invalid cache segments in response to them being marked regardless of whether a request is received for the invalid cache segments. Further, in one embodiment, the cache platform 103 allows the user to synchronize invalid cache segments on demand, regardless of the connection type and regardless of whether a request is received for the invalid cache segments. The cache platform 103 allows the user to select invalid cache segments and synchronize the cache segments on-demand.

At step 411, the cache platform 103 causes a synchronization of the one or more invalid cache segments in response to the notification. As discussed above, the synchronization includes the entire cache segment, and the entire content segment and index segment, that are affected by the change/notification. After the synchronization, the master device and the slave device are again synchronized with respect to the content and the cache. The cache platform 103 then continues performing synchronization as changes occur.

Figure 5:
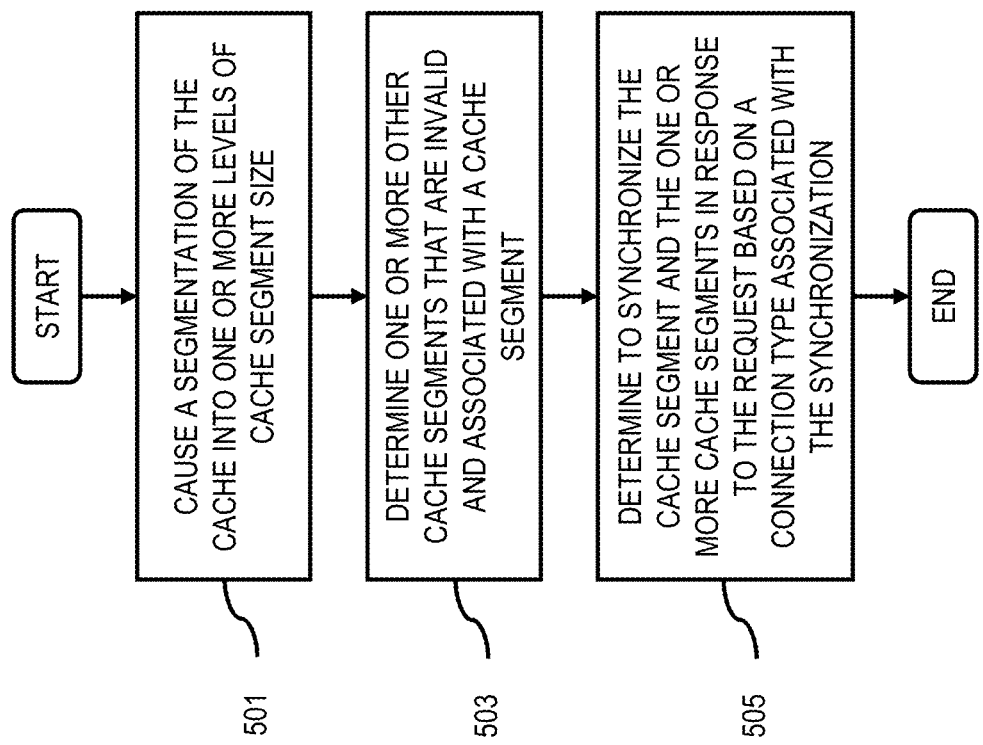
FIG. 5 is a flowchart of a process for segmenting a cache into one or more levels of cache segment sizes and synchronizing cache segments based on a cache level size, according to one example embodiment.

FIG. 5 is a flowchart of a process 500 for segmenting a cache into one or more levels of cache segment sizes and synchronizing cache segments based on a cache level size, according to one embodiment. In one embodiment, the cache platform 103 performs the process 500 and is implemented in, for instance, a chip set including a processor and a memory as shown in FIG. 9. In step 501, the cache platform 103 causes a segmentation of the cache into one or more levels of cache segment size. As discussed above, for example, if the entire cache is 1024 kb in size, the cache platform 103 may segment the cache into one level of two 512 kb cache segments, one level of four 256 kb cache segments, one level of eight 128 cache segments, one level of sixteen 64 kb cache segments, etc. Thus, the same information may be represented by multiple cache segments ranging in multiple cache segment sizes. By way of example, the segmentation that occurs at step 501 is similar to the segmentation that occurs at step 301 with respect to FIG. 3, but the segmentation occurs repeatedly for the number of different levels of segment sizes that are created. In one embodiment, the different levels of the segmentation may be based on a predefined range of segment sizes (e.g., 64 kb, 128, 256 kb, etc.). In one embodiment, the different levels of the segmentation may be based on the different types of connection possible (e.g., EDGE, 3G, 4G, WiMax, WiFi, etc.). In one embodiment, the different levels of segmentation may be based on segment sizes of cache segments that have historically been accessed the most and the least.

At step 503, in an embodiment where invalid cache segments are not synchronized automatically upon receiving a notification, there may be one or more cache segments that have been marked as being invalid but have not yet been synchronized because there has not yet been a request for the cache segments. In which case, when the cache is segmented based on one or more levels of segment size and a request is received associated with one cache segment that is invalid, that requested cache segment may be associated with other cache segments that are invalid at the same level of segment size. The association may be based on the cache segments all corresponding to the same cache segment of a larger size. By way of example, a cache segment of size 512 kb may be further segmented into four segments of cache segment size 128 kb. A request may be received for one of the cache segments that are 128 kb that are an invalid cache segments. Another one of the cache segments that is 128 kb may also have been marked as invalid but may have not yet been synchronized because, for example, a request may have not yet been received for the cache segment. Both of the invalid cache segments are associated because they are sub-segments of the larger cache segment.

In one embodiment, two sub-segments may be associated even though they are not within the same level of segment size. For example, rather than both of the cache segments discussed above being 128 kb, the requested cache segment may be 128 kb and the other invalid, non-requested segment may be 256 kb. Even if the 256 kb cache segment does not contain the same information as the 128 kb cache segment (e.g., the 128 kb cache segment is not a sub-segment of the 256 kb cache segment), both cache segments may be related by both being sub-segments of the same cache segment of the larger level of cache segment size (e.g., the 512 kb cache segment). In which case, as discussed above, both of the sub-segments may be synchronized in response to a request for either of the sub-segments by synchronizing entire the cache segment of the larger level of cache segment size rather than either one of the cache segments of the smaller level cache segment size.

At step 505, the cache platform 103 determines to synchronize the cache segment that is associated with the request, and any other cache segments associated with the cache segment associated with the request that corresponds to the same cache segment of a larger cache segment size, based on a connection type associated with the synchronization. Accordingly, in one embodiment, if the connection type associated with the synchronization is, for example, non-metered or above a set threshold speed, the cache platform 103 synchronizes all of the cache segments that are invalid and associated with a larger cache segment corresponding to other invalid cache segments by synchronizing the larger cache segment. In one embodiment, if the connection type associated with the synchronization is, for example, metered or below a set threshold speed, the cache platform 103 synchronizes only the invalid cache segment that is associated with the request, and not any other cache segments related based on corresponding to the same cache segment of a larger cache segment size.

FIG. 6 is a sequence diagram of a communications between three devices (e.g., UE 101a, UE 101b, and UE 101c) associated with synchronizing caches associated with content stored on one of the devices (e.g., UE 101a), according to one embodiment. In one embodiment, the connection type between the UE 101a and the UE 101b may be metered such that, for example, a cloud service acts as a proxy between the UE 101a and the UE 101b. Further, the connection type between the UE 101a and the UE 101c may be non-metered.

Sequences related to section 610 are associated with an initialization between the content of the UE 101a with the UE 101b and the UE 101c. In one embodiment, the UE 101a acts as the master in the sequence 600 and the UE 101b and the UE 101c act as the slave, read-only devices that are accessing the content on the UE 101a.

Thus, in one embodiment, the UE 101b creates a cache for the content associated with the UE 101a. A request 611 is sent from the UE 101b to the UE 101a for the content that the UE 101b will cache. However, rather than being sent directly to the UE 101a, the request 611 is sent to the cloud service. In response, the cloud service sends a request 612 that mirrors the request 611 to the UE 101a. In response, the UE 101a sends a message 613 back to the UE 101b including the content that the UE 101b requested that will be cached at the UE 101b so that, for example, a user of the UE 101b may browse the content of the UE 101a while at the UE 101b without having to actually communicate to the UE 101a. However, rather than being sent directly to the UE 101b, the message 613 is sent to the cloud service. In response, the cloud service sends a message 614 that mirrors the message 613 to the UE 101b. After receiving the message 614, at sequence 615 the UE 101b processes the message to generate a cache of the content associated with the UE 101a and creates cache segments associated with the cache. In one embodiment, information is sent from the UE 101b to the UE 101a so that the UE 101a may maintain, for example, the same cache, or a cache of the index content at the UE 101b to update the correct information with respect to the cache segments are the UE 101b. In one embodiment, in conjunction with step 613, the UE 101a also builds the same cache to have the same information used at the UE 101b to provide updated cache segments to the UE 101b.

In one embodiment, the UE 101c creates a cache for the content associated with the UE 101a. The UE 101c sends a request 616 to the UE 101a for the content the UE 101c will cache. Because, for example, the connection type between the UE 101c and the UE 101a is non-metered, the request 616 is sent directly to the UE 101a rather than going through, for example, a cloud service or proxy service. In response, the UE 101a sends a message 617 back to the UE 101c including the content that the UE 101c requested that will be cached. After receiving the message 617, at sequence 618 the UE 101c processes the messages to generate a cache of the content associated with the UE 101a and creates cache segments associated with the cache. As discussed above, in one embodiment the UE 101a also includes the information with respect to the cache to notify the UE 101c of the cache segments that are out of date and to update the entire cache segments during synchronization.

Sequences 620 are related to a change occurring within the content at the UE 101a that has been cached at the UE 101b and the UE 101c. In one embodiment, a change 621 occurs at the UE 101a associated with the content. In response, the UE 101a sends a notification 622 to the UE 101c indicating, for example, that a change has occurred in the content at the UE 101a. In one embodiment, the notification includes an indication of the index cache segment and the content segment that are affected by the change. Because the connection type between the UE 101c and the UE 101a is a non-metered connection, in response to the notification 622, the UE 101c initiates a request 623 for the index cache segment and the content segment associated with the change in the content from the UE 101a. In response to the request 623, the UE 101a responds with a message 624 including the modified index segment and the content segment. Accordingly, the cache of the UE 101c is synchronized with the content associated with the UE 101a.

In one embodiment, after the change occurs at the UE 101a, the UE 101a sends a notification 625 to the UE 101b indicating, for example, that a change occurred in the content at the UE 101a. Because, for example, the connection type between the UE 101a and the UE 101b is metered, the notification 625 is sent to the cloud service, and the cloud service sends a notification 626 to the UE 101b that mirrors the notification 625. As discussed above, the notifications 625 and 626 may include an indication of the index segment and the cache segment that were modified. However, rather that immediately synchronizing the modified index segment and the cache segment, the UE 101b processes the cache at sequence 627 indicating that the index segment and the content segment are invalid.

Sequences 630 are related to a request for content associated with the index segment and the content segment that were previously modified based on the change 621. At sequence 631, a user of the UE 101b requests to browse content associated with the UE 101a that is also associated with the index segment and content segment that were previously marked invalid. In response to the request, the UE 101b initiates a request 632 to synchronize the modified index segment and the content segment. The request 632 is sent to the cloud service, and the cloud service transmits a request 633 to synchronize the modified index segment and the content segment to the UE 101a. In response to the request 633, the UE 101a transmits a message 634 including the modified index segment and the content segment back to the UE 101b by way of the cloud service. In response to the message 634, the Platform Storage transmits the message 635 to the UE 101b. In response to the message 635, the UE 101b synchronizes the index segment and the content segment that were modified by the change in the content at the UE 101a.

Figure 7A:
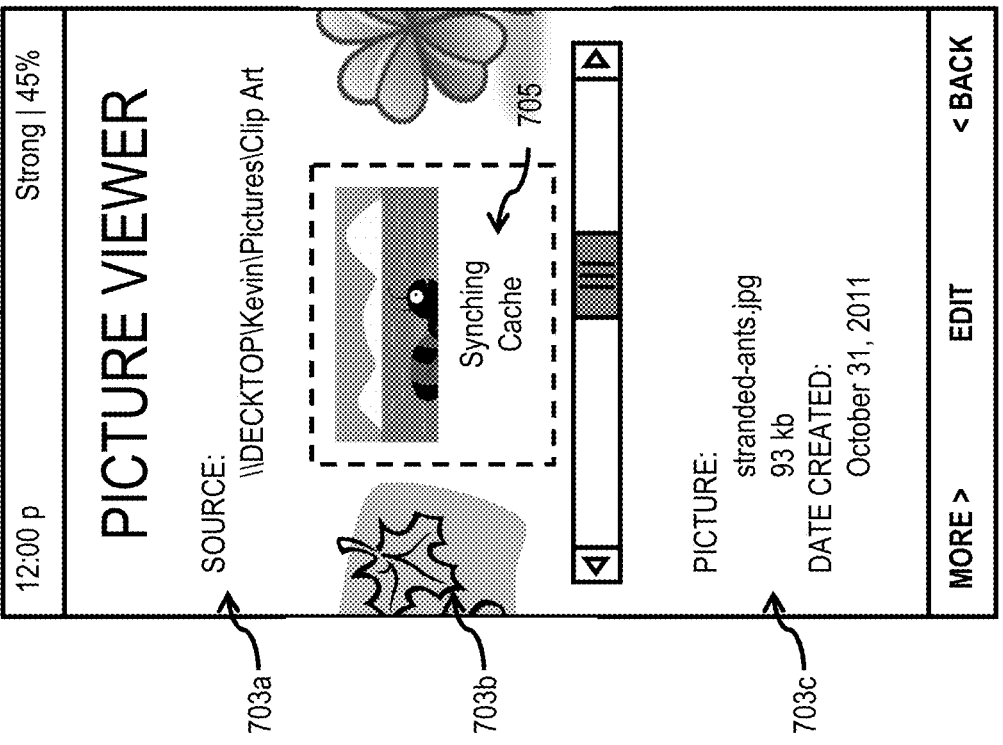
FIGS. 7A-7B are diagrams of user interfaces utilized in the processes of FIGS. 3-5, according various example embodiments.

FIG. 7A is a diagram of a user interface utilized in the processes of FIGS. 3-5, according one embodiment. The user interface 701a may be associated with a UE 101b that is viewing content associated with another UE 101 based on cached content at the UE 101b. The user interface 701a may be associated with, for example, viewing images (e.g., clip art) stored on another UE 101. Associated with the images may be metadata that is stored in the cache of the UE 101b. The user interface 701a may include an indication 703a of the directory associated with the content at the other UE 101. The user interface 701a may also include one or more thumbnails 703b of the images associated with the content at the other UE 101. The user interface 701a may also include an indication 703c of the filename, file size and date created associated with the content at the other UE 101. As illustrated by indicator 705, based on a request for the thumbnail associated with the file stranded-ants.jpg, a change may have occurred to the file at the other UE 101 such that the thumbnail needs to be updated. Accordingly, the indicator 705 indicates that the cache segment from where the thumbnail of the image is stored is being updated in response to the request for the thumbnail based on the processes described above.

Figure 7B:
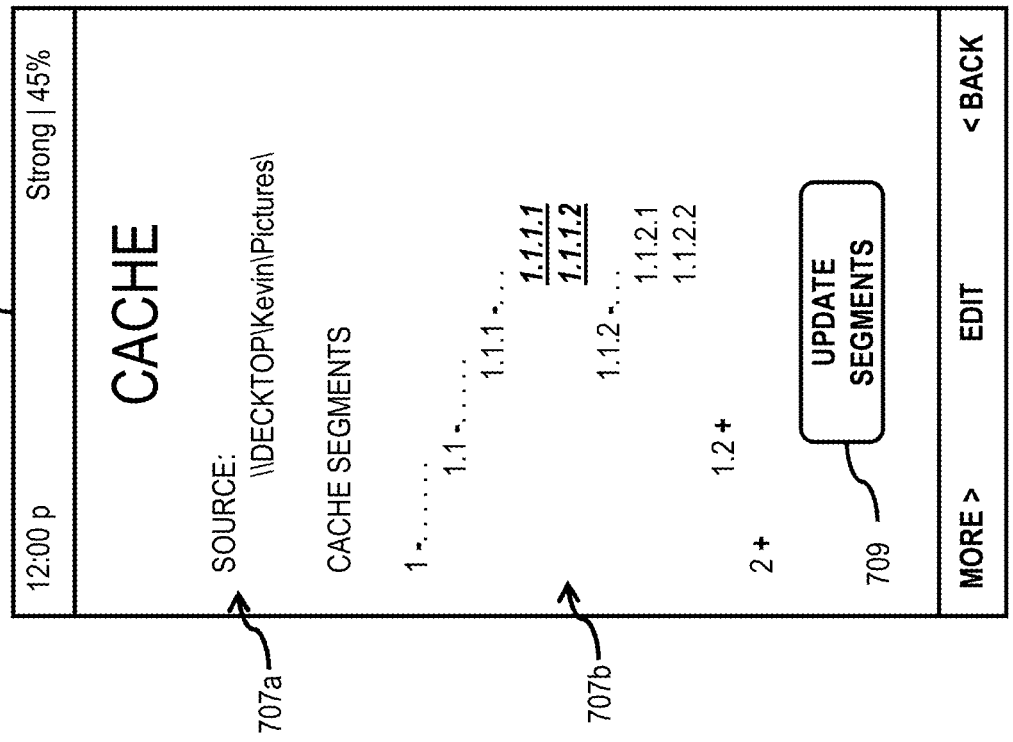

FIG. 7B is a diagram of a user interface utilized in the processes of FIGS. 3-5, according one embodiment. The user interface 701b may be associated with a UE 101b that has cached content in one or more cache segments. The user interface 701b includes indicator 707a that indicates, for example, where the information in the cache is being collected from on the other device. Further, indicator 707b indicates the various cache segments that are used to cache the information. As illustrated, the cache segments include four different levels of cache segment size represented by the four integers expanded out to the farthest extent with respect to cache segment 1.1. As also illustrated, cache segments 1.1.1.1 and 1.1.1.2 are bolded and underlined. The bolding may indicate, for example, that the cache segments have been marked as invalid. The underling may indicate, for example, that the cache segment has been selected. By way of example, the user interface 701b allows a user to synchronize the highlighted cache segments by selecting indicator 709. This allows, for example, the user to synchronize any selected cache segmented that has been marked as being invalid but may not have otherwise be associated with a request for content to have caused the cache platform 103 to automatically synchronize the cache segment. Thus, for example, if the user connects the UE 101a to the other device associated with the content, the user may select to have any or all of the segments marked as invalid updated.

The processes described herein for segmenting a cache into one or more cache segments and synchronizing the cache segments may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
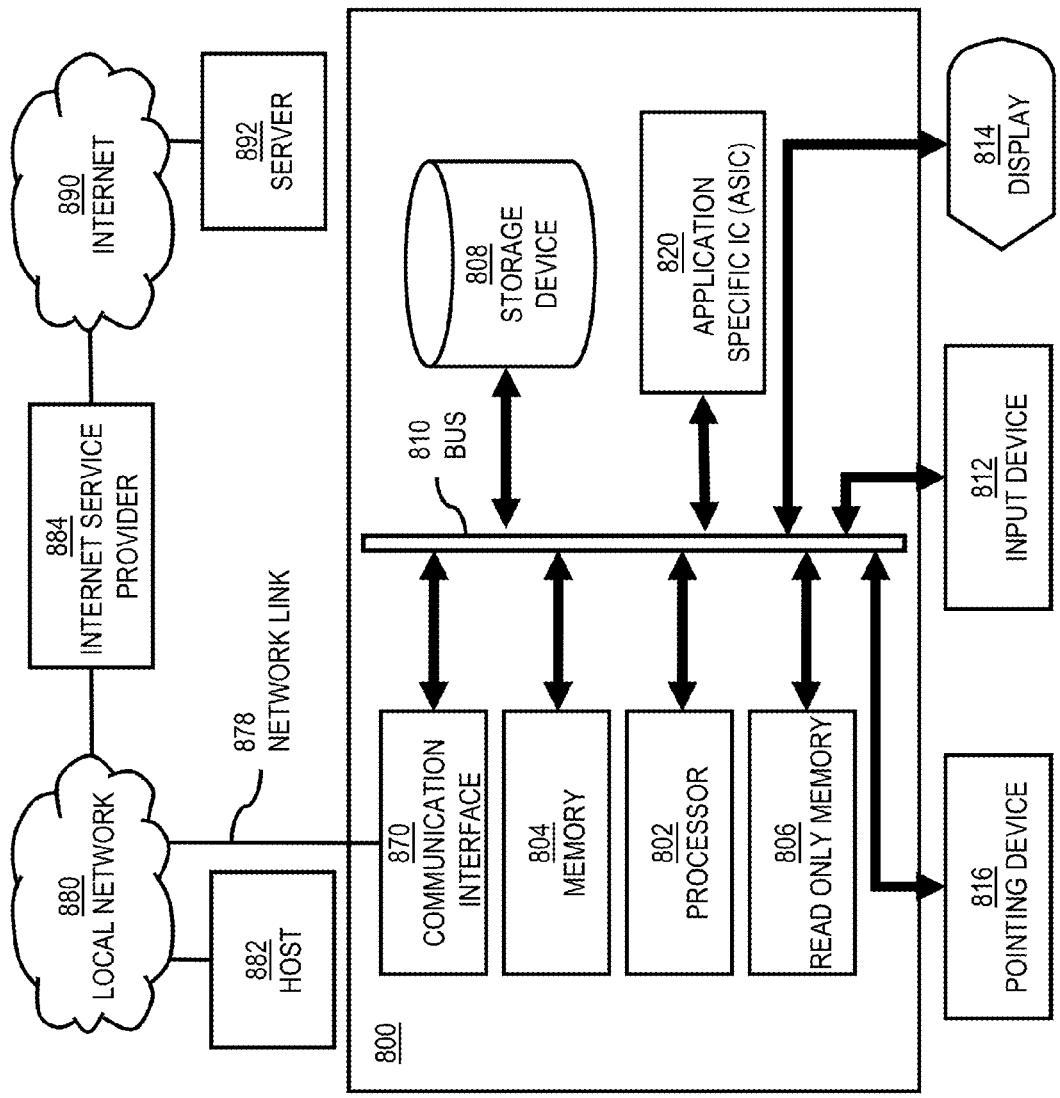
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to segment a cache into one or more cache segments and synchronize the cache segments as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of segmenting a cache into one or more cache segments and synchronizing the cache segments.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to segment a cache into one or more cache segments and synchronize the cache segments. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for segmenting a cache into one or more cache segments and synchronizing the cache segments. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for segmenting a cache into one or more cache segments and synchronizing the cache segments, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for segmenting a cache into one or more cache segments and synchronizing the cache segments at the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to segment a cache into one or more cache segments and synchronize the cache segments as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of segmenting a cache into one or more cache segments and synchronizing the cache segments.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to segment a cache into one or more cache segments and synchronize the cache segments. The memory 905 also stores the data associated with or generated by the execution of the inventive steps.

Figure 10:
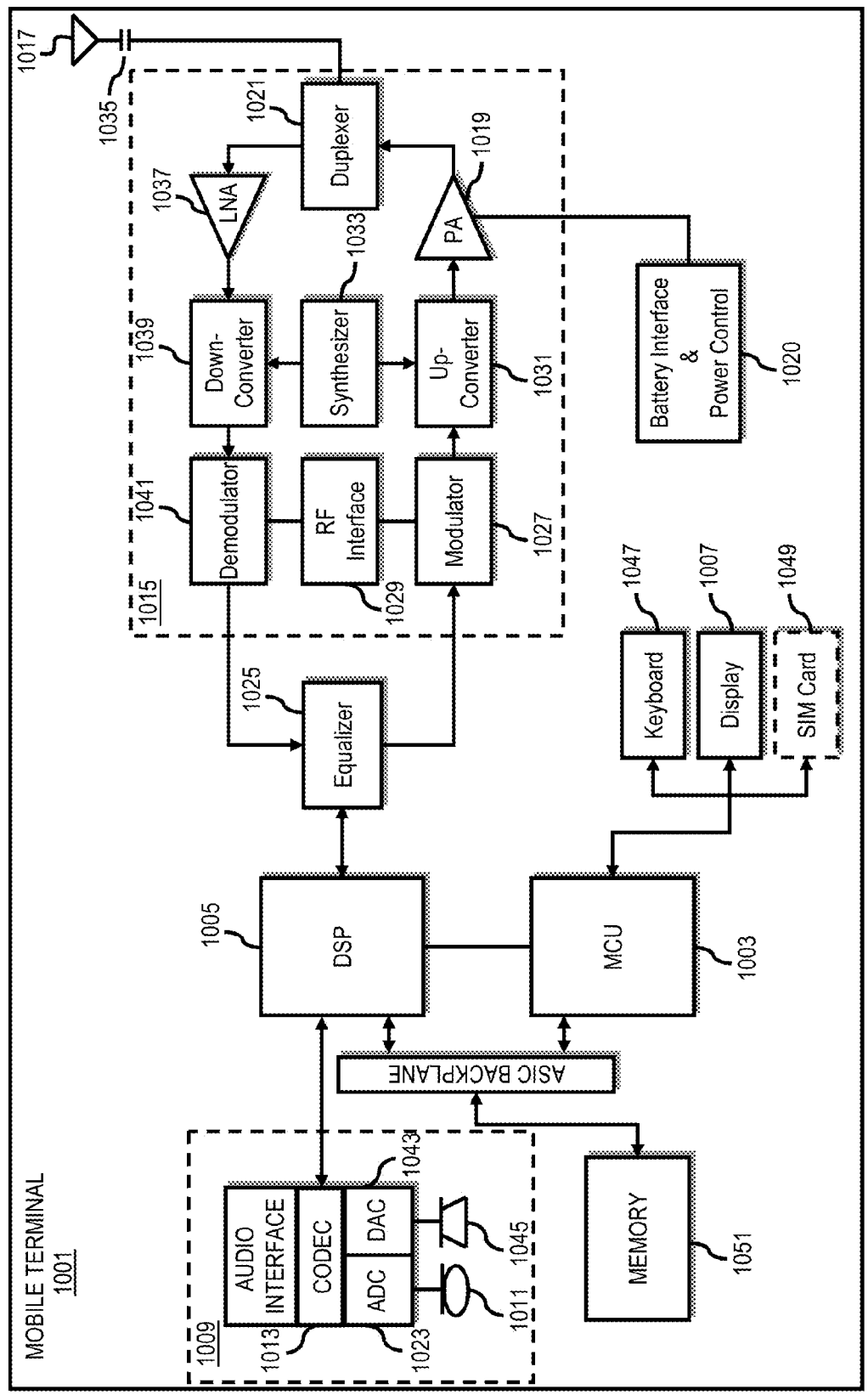
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of segmenting a cache into one or more cache segments and synchronizing the cache segments. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of segmenting a cache into one or more cache segments and synchronizing the cache segments. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to segment a cache into one or more cache segments and synchronize the cache segments. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    a segmentation of at least one cache into one or more cache segments having one or more levels of segment size;
    at least one change in information represented by the at least one cache;
    at least one determination that at least one cache segment of the one or more cache segments associated with the change in the information is invalid;
    at least one determination of a connection type associated with a synchronization of the at least one cache segment associated with the change in the information;
    the synchronization of the at least one cache segment, wherein the synchronization is based, at least in part, on the connection type associated with the synchronization and a number of invalid cache segments, a most accessed cache segment, a least accessed cache segment, at least one request for the at least one cache segment, or a combination thereof; and
    a size of the one or more cache segments based, at least in part, on the connection type associated with the synchronization including a data transfer speed of the connection and a most accessed cache segment, a least accessed cache segment, or a combination thereof.

2. A method of claim 1, wherein the (1) data and/or (2) information and/or (3) at least one signal are further based, at least in part, on the following:
    at least one determination that the connection type associated with the synchronization is a non-metered connection; and
    a synchronization of the at least one cache segment in response to a notification that the at least one cache segment is invalid.

3. A method of claim 1, wherein the (1) data and/or (2) information and/or (3) at least one signal are further based, at least in part, on the following:
    at least one determination that the connection type associated with the synchronization is a metered connection; and
    a synchronization of the at least one cache segment in response to the at least one request for the at least one cache segment, a threshold number of invalid cache segments, the most accessed cache segment, the least accessed cache segment, or a combination thereof.

4. A method of claim 1, wherein the (1) data and/or (2) information and/or (3) at least one signal are further based, at least in part, on the following:
    at least one request for the at least one cache segment;
    one or more other cache segments that are invalid and associated with the at least one cache segment based, at least in part, on the one or more other cache segments and the at least one cache segment corresponding to a cache segment of a larger level of segment size; and
    at least one determination to synchronize the at least one cache segment and the one or more other cache segments in response to the at least one request for the at least one cache segment based, at least in part, on a connection type associated with the synchronization.

5. A method of claim 1, wherein the (1) data and/or (2) information and/or (3) at least one signal are further based, at least in part, on the following:
    a notification that the one or more cache segments associated with the change in the information is invalid.

6. A method of claim 1, wherein the one or more cache segments include, at least in part, one or more content segments, one or more index segments, or a combination thereof.

7. An apparatus comprising:
    at least one processor; and
    at least one memory including computer program code for one or more programs,
    the at least one memory and the computer program code configured to, with the at least one processor, cause the apparatus to perform at least the following,
        cause, at least in part, a segmentation of at least one cache into one or more cache segments having one or more levels of segment size;
        determine at least one change in information represented by the at least one cache;
            determine that at least one cache segment of the one or more cache segments associated with the change in the information is invalid;
        determine a connection type associated with a synchronization of the at least one cache segment associated with the change in the information;
        cause, at least in part, the synchronization of the at least one cache segment, the synchronization being based, at least in part, on the connection type associated with the synchronization and a threshold number of invalid cache segments, a most accessed cache segment, a least accessed cache segment, at least one request for the at least one cache segment, or a combination thereof; and
        determine a size of the one or more cache segments based, at least in part, on the connection type associated with the synchronization including a data transfer speed of the connection and a most accessed cache segment, a least accessed cache segment, or a combination thereof.

8. An apparatus of claim 7, wherein the apparatus is further caused to:
    determine that the connection type associated with the synchronization is a non-metered connection; and
    cause, at least in part, the synchronization of the at least one cache segment in response to a notification that the at least one cache segment is invalid.

9. An apparatus of claim 7, wherein the apparatus is further caused to:
    determine that the connection type associated with the synchronization is a metered connection; and
    cause, at least in part, the synchronization of the at least one cache segment in response to the at least one request for the at least one cache segment, a threshold number of invalid cache segments, the most accessed cache segment, the least accessed cache segment, or a combination thereof.

10. An apparatus of claim 7, wherein the apparatus is further caused to:
    determine at least one request for the at least one cache segment;
    determine one or more other cache segments that are invalid and associated with the at least one cache segment based, at least in part, on the one or more other cache segments and the at least one cache segment corresponding to a cache segment of a larger level of segment size; and
    determine to synchronize the at least one cache segment and the one or more other cache segments in response to the at least one request for the at least one cache segment based, at least in part, on a connection type associated with the synchronization.

11. An apparatus of claim 7, wherein the apparatus is further caused to:

cause, at least in part, a notification that the one or more cache segments associated with the change in the information is invalid.

12. An apparatus of claim 7, wherein the one or more cache segments include, at least in part, one or more content segments, one or more index segments, or a combination thereof.

* * * * *

UNITED STATES PATENT AND TRADEMARK OFFICE
CERTIFICATE OF CORRECTION

PATENT NO. : 9,098,420 B2  Page 1 of 1
APPLICATION NO. : 13/279020
DATED : August 4, 2015
INVENTOR(S) : Bulut et al.

It is certified that error appears in the above-identified patent and that said Letters Patent is hereby corrected as shown below:

On the title page item [73] "Nokia Technology OY, Espoo (FI)" should read:

"Nokia Technologies, OY, Espoo (FI)"

Signed and Sealed this
Ninth Day of February, 2016

Michelle K. Lee
*Director of the United States Patent and Trademark Office*